United States Patent [19]

Sugiyama et al.

[11] 4,134,645
[45] Jan. 16, 1979

[54] MINIATURIZED TELEPHOTO CAMERA LENS

[75] Inventors: Takahiro Sugiyama; Toshifumi Kubota; Rensuke Adachi, all of Tokyo, Japan

[73] Assignee: Asahi Kogaku Kogyo Kabushiki Kaisha, Tokyo, Japan

[21] Appl. No.: 827,636

[22] Filed: Aug. 25, 1977

[30] Foreign Application Priority Data

Aug. 26, 1976 [JP] Japan ................. 51-101957

[51] Int. Cl.² ............................................. G02B 9/60
[52] U.S. Cl. .................................. 350/216; 350/176
[58] Field of Search ............................ 350/216, 176

[56] References Cited

U.S. PATENT DOCUMENTS 3,887,269  6/1975  Nakagawa ..................... 350/216

FOREIGN PATENT DOCUMENTS 1105188  3/1968  United Kingdom ............... 350/216

Primary Examiner—Paul A. Sacher
Attorney, Agent, or Firm—Sughrue, Rothwell, Mion, Zinn and Macpeak

[57] ABSTRACT

A miniaturized telephoto camera lens assembly comprises a first positive lens, a second negative lens, and a third positive meniscus lens having a higher object side curvature. These lenses are disposed close together, and relatively remote from closely spaced fourth and fifth positive and negative meniscus lenses, respectively, each having higher object side curvatures. The optical parameters of the lens assembly are chosen to satisfy seven specified conditions relating to composite focal distances, spacing distances, Abbe numbers, and refractive index to optimize miniaturization while still achieving a high level of optical performance.

3 Claims, 6 Drawing Figures

MINIATURIZED TELEPHOTO CAMERA LENS

BACKGROUND OF THE INVENTION

This invention relates to a miniaturized telescopic or telephoto camera lens assembly having a brightness value or f-number on the order of from 1:3.5 to 1:2.8 and a coverage angle on the order of from 16° to 20°.

Telephoto lens assemblies in the 100 mm range are frequently used in general purpose photography, and their miniaturization is therefore an important factor with respect to ease the handling and interchangeability. In the past, however, no significant efforts have been made to increase the telescopic ratio, i.e. the total length plus back focal length of the lens assembly compared with its composite focal length. The present invention has been developed with this aim in mind, and represents an improvement on the invention disclosed in Japanese Patent Application Publication No. 3417/1968. Example 1 described below thus provides a wide angle telephoto lens assembly without decreasing the telescopic ratio, while Examples 2 and 3 increase the telescopic ratio at a slight sacrifice in viewing angle.

SUMMARY OF THE INVENTION

A miniaturized telephotoscopic lens assembly according to this invention comprises a first positive lens, a second negative lens, and a third positive meniscus lens whose object side surface has a greater curvature. These first, second and third lenses are positioned relatively close to one another. The fourth lens is also a positive meniscus lens having a higher object side curvature, and it is positioned relatively remote from the third lens. The fifth lens is a negative meniscus lens positioned relatively close to the fourth lens and also having a higher object side curvature.

The optical parameters of the lens assembly are selected to satisfy the following conditions:

(1) $F/1.8 < F_{1,2,3} < F/1.2$,
(2) $F/2.5 < F_{1,2,3,4} < F/1.85$,
(3) $0.22F < d_6 < 0.32F$,
(4) $\nu_2 < 28$,
(5) $\nu_1 \cdot \nu_3 > 58$,
(6) $n_5 > 1.62$, and
(7) $0.015F < d_8 < 0.065F$, wherein:
F is the composite focal distance of the overall lens system,
$F_{1,2...i}$ is the composite focal distance of the first through the i-th lenses,
$d_k$ is the k-th surface distance measured along the optical axis,
$n_i$ is the refractive index of the i-th lens, and
$\nu_i$ is the Abbe number of the i-th lens.

DETAILED DESCRIPTION OF THE PREFERRED EMBODIMENTS

Figure 1:
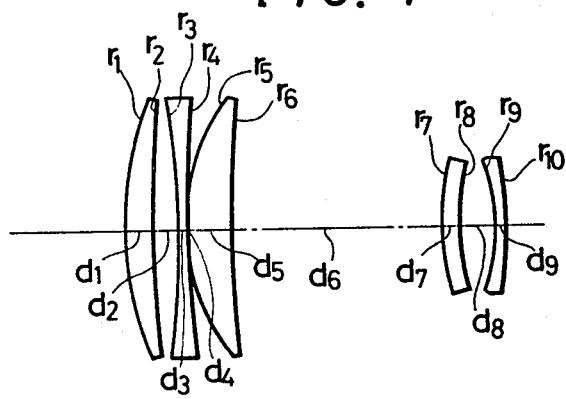
FIGS. 1, 3 and 5 show optical diagrams of lens assemblies in accordance with this invention, as disclosed in Examples 1, 2 and 3 below, respectively.
Figure 2:
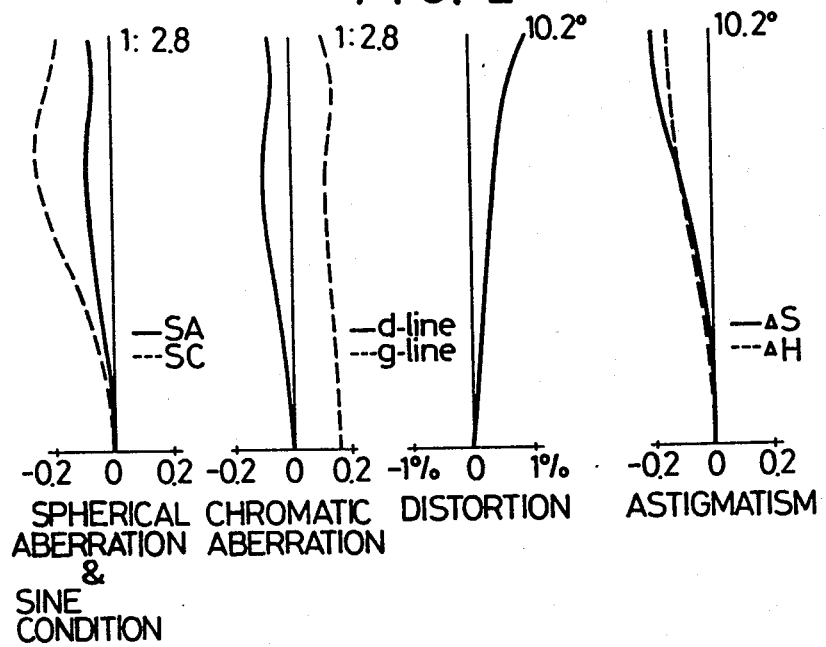
FIGS. 2, 4 and 6 show abberration curves for the lens assemblies of Examples 1, 2 and 3, respectively.

Referring to the individual lens characteristics and the seven specific conditions set forth above, the first condition is necessary to increase the telescopic ratio, and is closely associated with conditions (2) through (5).

In this lens system, in order to increase the telescopic ratio it is preferable to increase the positive power of the first through the fourth lenses; however, it is also necessary to increase the power of the first through the third lenses to some extent, and condition (1) relates to this consideration. When $F_{1,2,3}$ is smaller than the lower limit of F/1.8, the burdens or requirements imposed on the first and third lenses are increased, and it is becomes difficult to increase their covering angles. Because of this the value $F_{1,2,3}$ is set at F/1.28 in a first example (described later) to provide a wide viewing angle, and in a third example for which a wide viewing angle is not necessary, the value $F_{1,2,3}$ is set at F/1.60. In contrast, when $F_{1,2,3}$ is greater than the upper limit of F/1.2 it is difficult to achieve miniaturization, and the burden on the fourth lens is increased. If in this case the astigmatism effect of the seventh surface is to be utilized, the positive astigmatism of the eighth surface is liable to increase. Thus, a value of $F_{1,2,3}$ greater than the upper limit is not suitable, and accordingly, in all of the examples below, the fourth lenses have substantially similar powers.

Condition (2) determines the power of the fourth lens in relation to condition (1). As described above, condition (2) indicates the necessity for all of the fourth lenses to have substantially similar powers. If the value $F_{1,2,3,4}$ is smaller than the lower limit of F/2.5 the telescopic ratio can effectively be increased, but the Petzval's sum is likely to decrease while the positive astigmatism tends to increase, as a result of which the aberration balance may be impaired. In contrast, when $F_{1,2,3,4}$ is greater than the upper limit of F/1.85 the miniaturization of the overall lens assembly is greatly diminished. In addition, the Petzval's sum is increased, which is disadvantageous in terms of correcting abberation.

Condition (3) is another important miniaturization criterion. When $d_6$ is less than the lower limit of 0.22F and condition (1) is still satisfied, miniaturization may be lost. To complement or offset such loss it is necessary to make the value of $d_8$ greater than the upper limit of condition (7). In this case, however, the Petzval's sum tends to decrease in connection with conditions (1) and (2). In addition, it may become difficult to obtain a suitable value of astigmatism at the seventh surface, and to correct the negative astigmatism and negative spherical aberration of the ninth surfaces. In contrast, when $d_6$ exceeds the upper limit of 0.32F it is advantageous for miniaturization, but decreases the Petzval's sum and impairs the aberration balance.

Condition (4) corrects the color aberration of the first through the third lenses and renders condition (3) more effective. Condition (4) is also closely related to condition (5). To minimize any decrease in the Petzval's sum with the first through the third lenses it is desirable to decrease the power of each lens, which necessitates conditions (4) and (5). These are thus auxiliary conditions to make conditions (1) through (3) effective.

Condition (6) prevents a decrease in the Petzval's sum when miniaturization is effected by conditions (1), (2) and (3).

As described in the aforementioned Japanese Patent Application Publication No. 3417/1968, achromatism is primarily obtained with the first through the third lenses, and the correction is rather excessive. Therefore, the correction of color aberration with respect to magnification effected with the fourth lens is insufficient. As is clear from condition (7), the distance between the fourth and fifth lenses is relatively short, and it is therefore necessary to employ a fourth lens whose $\nu$ value is relatively small. In addition, to minimize the decrease in the Petzval's sum it is preferable to use a glass material which has a high refractive index, such as flint glass or dense flint glass. In Example 1 it is impossible to make the Petzval's sum small and a suitable countermeasure is employed at a separate position, and therefore flint glass is used whose refractive index is just below that of dense flint glass.

If condition (3) is effectively utilized and achromatism is suitably established, a decrease in Petzval's sum can be prevented with a fifth lens whose Abbe number is large. However, it is preferable to use glass whose refractive index is higher than 1.62 in order to prevent a decrease in the Petzval's sum.

According to condition (7) it is desirable to make $d_8$ smaller than 0.065F in order to minimize the decrease in the Petzval's sum, in association with condition (6). If $d_8$ is smaller than 0.015F, however, it becomes difficult to correct the color aberration, and in addition a manufacturing limitation occurs with respect to the arrangement of the fourth and fifth lenses.

Figure 3:
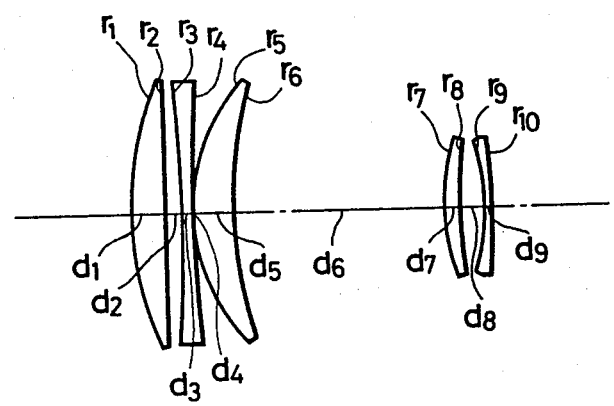
Figure 4:
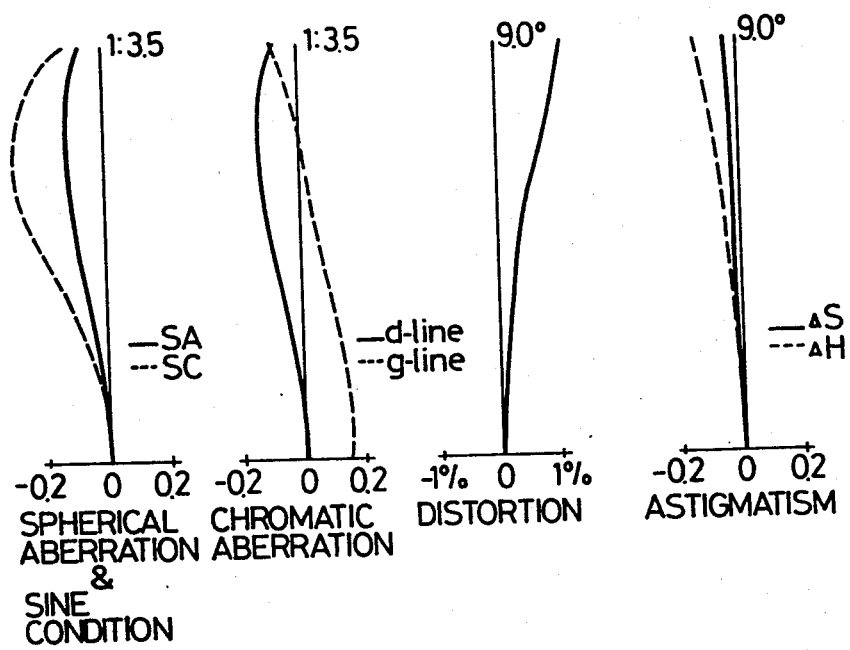
Figure 5:
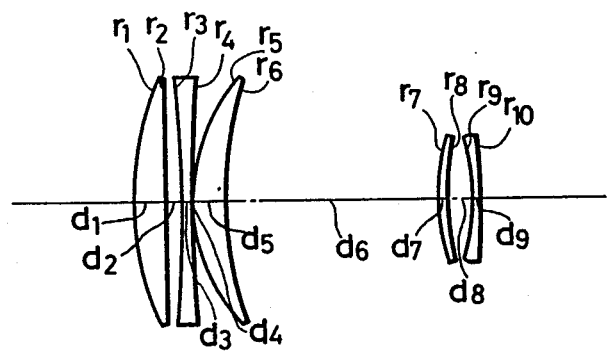
Figure 6:
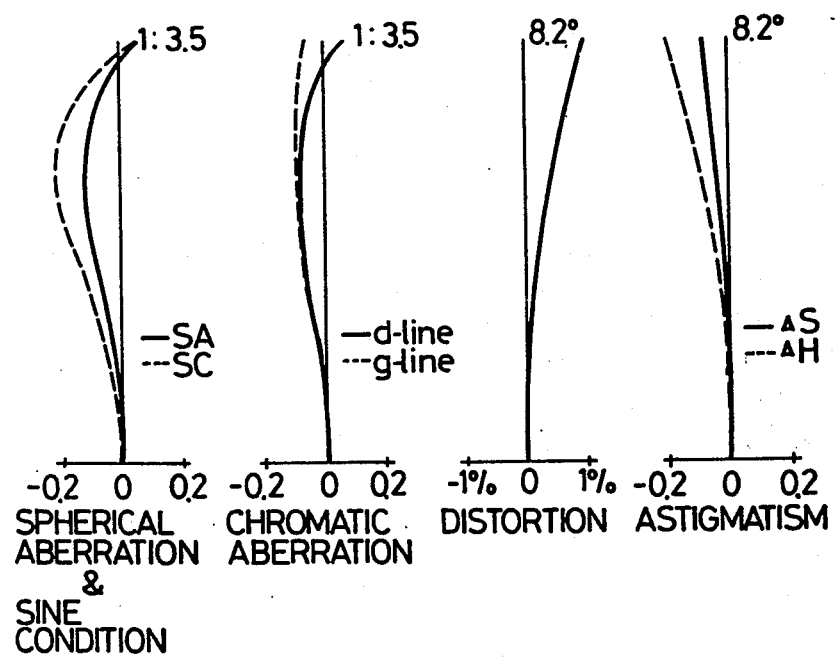

Optical parameters are listed below in Examples 1, 2 and 3 for lens assemblies in accordance with this invention as illustrated in FIGS. 1, 3 and 5, respectively, wherein:

$\omega$ is the half-viewing angle, and
$r_j$ is the j-th radius of curvature.

EXAMPLE 1

| $F = 100mm$ | | $f = 1:2.8$ | | $\omega = \pm 10.2°$ |
|---|---|---|---|---|
| $r_1 =$ | 38.98 | $d_1 =$ | 4.86 | $n_1/\nu_1 = 1.51821/65.0$ |
| $r_2 =$ | 145.48 | $d_2 =$ | 3.19 | |
| $r_3 =$ | −112.72 | $d_3 =$ | 1.68 | $n_2/\nu_2 = 1.80518/25.4$ |
| $r_4 =$ | 209.73 | $d_4 =$ | 0.08 | |
| $r_5 =$ | 30.94 | $d_5 =$ | 5.81 | $n_3/\nu_3 = 1.55963/61.2$ |
| $r_6 =$ | 134.14 | $d_6 =$ | 28.84 | |
| $r_7 =$ | 30.61 | $d_7 =$ | 2.88 | $n_4/\nu_4 = 1.80518/25.4$ |
| $r_8 =$ | 53.93 | $d_8 =$ | 4.86 | |
| $r_9 =$ | −20.54 | $d_9 =$ | 1.26 | $n_5/\nu_5 = 1.80610/40.9$ |
| $r_{10} =$ | −56.03 | | | |

Backfocus = 35.52
$F_{1.2.3} = F/1.283 = 77.97$
$F_{1.2.3.4} = F/1.896 = 52.73$
Petzval's sum = 0.170

EXAMPLE 2

| $F = 100mm$ | | $f = 1:3.5$ | | $\omega = \pm 9.0°$ |
|---|---|---|---|---|
| $r_1 =$ | 35.11 | $d_1 =$ | 4.19 | $n_1/\nu_1 = 1.51633/64.1$ |
| $r_2 =$ | 308.89 | $d_2 =$ | 1.81 | |
| $r_3 =$ | −130.89 | $d_3 =$ | 1.33 | $n_2/\nu_2 = 1.78470/26.2$ |
| $r_4 =$ | 120.83 | $d_4 =$ | 0.08 | |
| $r_5 =$ | 20.95 | $d_5 =$ | 4.61 | $n_3/\nu_3 = 1.51821/65.0$ |
| $r_6 =$ | 49.51 | $d_6 =$ | 23.44 | |
| $r_7 =$ | 26.73 | $d_7 =$ | 1.93 | $n_4/\nu_4 = 1.72825/28.5$ |
| $r_8 =$ | 47.51 | $d_8 =$ | 2.48 | |
| $r_9 =$ | −15.46 | $d_9 =$ | 0.90 | $n_5/\nu_5 = 1.64000/60.2$ |
| $r_{10} =$ | −52.20 | | | |

Backfocus = 40.31
$F_{1.2.3} = F/1.550 = 64.53$
$F_{1.2.3.4} = F/2.186 = 45.75$
Petzval's sum = 0.018

EXAMPLE 3

| $F = 100mm$ | | $f = 1:3.5$ | | $\omega = \pm 8.2°$ |
|---|---|---|---|---|
| $r_1 =$ | 33.81 | $d_1 =$ | 3.54 | $n_1/\nu_1 = 1.51112/60.5$ |
| $r_2 =$ | 428.55 | $d_2 =$ | 1.41 | |
| $r_3 =$ | −145.86 | $d_3 =$ | 1.33 | $n_2/\nu_2 = 1.80518/25.4$ |
| $r_4 =$ | 118.64 | $d_4 =$ | 0.07 | |
| $r_5 =$ | 20.57 | $d_5 =$ | 3.87 | $n_3/\nu_3 = 1.51633/64.1$ |
| $r_6 =$ | 45.19 | $d_6 =$ | 23.99 | |
| $r_7 =$ | 27.41 | $d_7 =$ | 1.21 | $n_4/\nu_4 = 1.72825/28.5$ |
| $r_8 =$ | 55.22 | $d_8 =$ | 2.72 | |
| $r_9 =$ | −15.87 | $d_9 =$ | 0.80 | $n_5/\nu_5 = 1.65160/58.6$ |
| $r_{10} =$ | −67.11 | | | |

Backfocus = 40.40
$F_{1.2.3} = F/1.597 = 62.60$
$F_{1.2.3.4} = F/2.279 = 43.89$
Petzval's sum = 0.020

What is claimed is:

1. A miniaturized telephoto camera lens assembly, comprising: in order, a first positive lens $L_1$, a second negative lens $L_2$, and a third positive meniscus lens $L_3$ each having a higher object side curvature, the first, second, and third lenses being arranged relatively close to one another, a fourth positive meniscus lens $L_4$ having a higher object side curvature, and a fifth negative meniscus lens $L_5$ having a higher object side curvature, the fourth lens being arranged relatively remote from the third lens and the fifth lens being arranged relatively close to the fourth lens, and the lens assembly satisfying the following conditions:

| | $F = 100mm$, | $f = 1:2.8$, | $\omega = \pm 10.2°$ |
|---|---|---|---|
| $L_1 \begin{cases} r_1 = 38.98 \\ r_2 = 145.48 \end{cases}$ | | $d_1 = 4.86$ | $n_1/\nu_1 = 1.51821/65.0$ |
| | | $d_2 = 3.19$ | |
| $L_2 \begin{cases} r_3 = -112.72 \\ r_4 = 209.73 \end{cases}$ | | $d_3 = 1.68$ | $n_2/\nu_2 = 1.80518/25.4$ |
| | | $d_4 = 0.08$ | |
| $L_3 \begin{cases} r_5 = 30.94 \\ r_6 = 134.14 \end{cases}$ | | $d_5 = 5.81$ | $n_3\nu_3 = 1.55963/61.2$ |
| | | $d_6 = 28.84$ | |
| $L_4 \begin{cases} r_7 = 30.61 \\ r_8 = 53.93 \end{cases}$ | | $d_7 = 2.88$ | $n_4/\nu_4 = 1.80518/25.4$ |
| | | $d_8 = 4.86$ | |
| $L_5 \begin{cases} r_9 = -20.54 \\ r_{10} = -56.03 \end{cases}$ | | $d_9 = 1.26$ | $n_5/\nu_5 = 1.80610/40.9$ |

Backfocus = 35.52
$F_{1.2.3} = F/1.283 = 77.97$
$F_{1.2.3.4} = F/1.896 \cdot 52.73$
Petzval's sum = 0.170 wherein:
f is the f-number,
$\omega$ is the coverage angle,
F is the composite focal distance of the overall lens assembly,
$F_{1.2...i}$ is the composite focal distance of the first through the i-th lenses,
$r_k$ is the radius of carvature of the k-th surface,
$d_k$ is the k-th surface distance measured along the optical axis,
$n_i$ is the refractive index of the i-th lens, and
$\nu_i$ is the Abbe number of the i-th lens.

2. A miniaturized telephoto camera lens assembly, comprising: in order, a first positive lens $L_1$, a second negative lens $L_2$, and a third positive meniscus lens $L_3$ each having a higher object side curvature, the first, second, and third lenses being arranged relatively close to one another, a fourth positive meniscus lens $L_4$ having a higher object side curvature, and a fifth negative meniscus lens $L_5$ having a higher object side curvature, the fourth lens being arranged relatively remote from the third lens and the fifth lens being arranged relatively close to the fourth lens, and the lens assembly satisfying the following conditions:

| | $F = 100mm,$ | $f = 1:3.5,$ | $\omega = \pm 9.0°$ |
|---|---|---|---|
| $L_1$ | $r_1 = 35.11$ | $d_1 = 4.19$ | $n_1/\nu_1 = 1.51633/64.1$ |
| | $r_2 = 308.89$ | $d_2 = 1.81$ | |
| $L_2$ | $r_3 = -130.89$ | $d_3 = 1.33$ | $n_2/\nu_2 = 1.78470/26.2$ |
| | $r_4 = 120.83$ | $d_4 = 0.08$ | |
| $L_3$ | $r_5 = 20.95$ | $d_5 = 4.61$ | $n_3/\nu_3 = 1.51821/65.0$ |
| | $r_6 = 49.51$ | $d_6 = 23.44$ | |
| $L_4$ | $r_7 = 26.73$ | $d_7 = 1.93$ | $n_4/\nu_4 = 1.72825/28.5$ |
| | $r_8 = 47.51$ | $d_8 = 2.48$ | |
| $L_5$ | $r_9 = -15.46$ | $d_9 = 0.90$ | $n_5/\nu_5 = 1.64000/60.2$ |
| | $r_{10} = -52.20$ | | |
| | Backfocus = 40.31 | | |
| | $F_{1.2.3} = F/1.550 = 64.53$ | | |
| | $F_{1.2.3.4} = F/2.186 = 45.75$ | | |
| | Petzval's sum = 0.018 | | | wherein:
 f is the f-number,
 ω is the coverage angle,
 F is the composite focal distance of the overall lens assembly,
 $F_{1.2...i}$ is the composite focal distance of the first through the i-th lenses,
 $r_k$ is the radius of curvature of the k-th surface,
 $d_k$ is the k-th surface distance measured along the optical axis,
 $n_i$ is the refractive index of the i-th lens, and
 $\nu_i$ is the Abbe number of the i-th lens.

3. A miniaturized telephoto camera lens assembly, comprising: in order, a first positive lens $L_1$, a second negative lens $L_2$, and a third positive meniscus lens $L_3$ each having a higher object side curvature, the first, second, and third lenses being arranged relatively close to one another, a fourth positive meniscus lens $L_4$ having a higher object side curvature, and a fifth negative meniscus lens $L_5$ having a higher object side curvature, the fourth lens being arranged relatively remote from the third lens and the fifth lens being arranged relatively close to the fourth lens, and the lens assembly satisfying the following conditions:

| | $F = 100mm,$ | $f = 1:3.5,$ | $\omega = \pm 8.2°$ |
|---|---|---|---|
| $L_1$ | $r_1 = 33.81$ | $d_1 = 3.54$ | $n_1/\nu_1 = 1.51112/60.5$ |
| | $r_2 = 428.55$ | $d_2 = 1.41$ | |
| $L_2$ | $r_3 = -145.86$ | $d_3 = 1.33$ | $n_2/\nu_2 = 1.80518/25.4$ |
| | $r_4 = 118.64$ | $d_4 = 0.07$ | |
| $L_3$ | $r_5 = 20.57$ | $d_5 = 3.87$ | $n_3/\nu_3 = 1.51633/64.1$ |
| | $r_6 = 45.19$ | $d_6 = 23.99$ | |
| $L_4$ | $r_7 = 27.41$ | $d_7 = 1.21$ | $n_4/\nu_4 = 1.72825/28.5$ |
| | $r_8 = 55.22$ | $d_8 = 2.72$ | |
| $L_5$ | $r_9 = -15.87$ | $d_9 = 0.80$ | $n_5/\nu_5 = 1.65160/58.6$ |
| | $r_{10} = -67.11$ | | |
| | Backfocus = 40.40 | | |
| | $F_{1.2.3} = F/1.597 = 62.60$ | | |
| | $F_{1.2.3.4} = F/2.279 = 43.89$ | | |
| | Petzval's sum = 0.020 | | | wherein:
 f is the f-number,
 ω is the coverage angle,
 F is the composite focal distance of the overall lens assembly,
 $F_{1.2...i}$ is the composite focal distance of the first through the i-th lenses,
 $r_k$ is the radius of curvature of the k-th surface, $d_k$ is the k-th surface distance measured along the optical axis,
 $n_i$ is the refractive index of the i-th lens, and
 $\nu_i$ is the Abbe number of the i-th lens.

* * * * *